(12) United States Patent
Miller

(10) Patent No.: US 11,979,637 B2
(45) Date of Patent: *May 7, 2024

(54) SYSTEMS AND METHODS FOR PROVIDING CONTENT RECOMMENDATIONS

(71) Applicant: Rovi Guides, Inc., San Jose, CA (US)

(72) Inventor: Kyle Miller, Durham, NC (US)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/970,267

(22) Filed: Oct. 20, 2022

(65) Prior Publication Data
US 2023/0254540 A1     Aug. 10, 2023

Related U.S. Application Data

(63) Continuation of application No. 17/091,080, filed on Nov. 6, 2020, now Pat. No. 11,509,965.

(51) Int. Cl.
*H04N 21/466* (2011.01)
*H04N 21/472* (2011.01)

(52) U.S. Cl.
CPC ..... *H04N 21/4668* (2013.01); *H04N 21/4667* (2013.01); *H04N 21/47202* (2013.01)

(58) Field of Classification Search
None
See application file for complete search history.

(56) References Cited

U.S. PATENT DOCUMENTS

| | | | |
|---|---|---|---|
| 6,388,714 B1 | 5/2002 | Schein et al. | |
| 6,756,997 B1 | 6/2004 | Ward et al. | |
| 7,761,892 B2 | 7/2010 | Ellis et al. | |
| 11,509,965 B2 * | 11/2022 | Miller | H04N 21/47202 |
| 2006/0100963 A1 | 5/2006 | Leurs et al. | |
| 2009/0018845 A1 * | 1/2009 | Morel | H04N 21/84 348/E7.054 |
| 2020/0169789 A1 * | 5/2020 | Kim | H04N 21/45 |
| 2022/0150591 A1 | 5/2022 | Miller | |

* cited by examiner

*Primary Examiner* — Jefferey F Harold
*Assistant Examiner* — Charles N Hicks
(74) *Attorney, Agent, or Firm* — Haley Guiliano LLP

(57) ABSTRACT

Systems and associated methods are described for providing content recommendations. The system receives a plurality of sets of range values, each of which corresponds to a respective one of a plurality of parameters for recommending the content. The system selects different values within each of the plurality of sets of range values over time and provides a plurality of content recommendations to users based on the selected different values. The system then analyze users' behavior in response to the provided plurality of content recommendations. The system further updates at least one set of range values based on the analyzed users' behavior.

20 Claims, 6 Drawing Sheets

SYSTEMS AND METHODS FOR PROVIDING CONTENT RECOMMENDATIONS

CROSS-REFERENCE TO RELATED APPLICATION

This application is a continuation of U.S. patent application Ser. No. 17/091,080, filed Nov. 6, 2020, the disclosure of which is incorporated by reference in its entirety.

BACKGROUND

The present disclosure relates to systems and methods for optimizing content recommendations. In particular, techniques are disclosed for tailoring multiple content recommendation algorithms to select content recommendations relevant to users.

SUMMARY

With the proliferation of content available today in computing devices, such as smart TVs, laptops, smartphones, tablets, and smart speakers, there has been an increase in the use of content distribution systems to provide content recommendations and predictions. Many different algorithms and techniques may be used to select content that is relevant to a user to maximize the probability of displaying content recommendations that are relevant (e.g., by presenting identifiers of content items that the user is likely to view). For example, a content distribution system may recommend content based on different parameters related to content. Some examples of the parameters include popularity of content among users, recency of content, similar to favorite content, similar to content liked by the users, and/or critic of the content or a variety of other parameters.

Content distribution system can allow content providers to provide recommendations of the content for the users. For example, a content provider will provide values or range of values of the different parameters for recommending the content, which is run by the system using various machine learning models resulting in the content recommendation. However, the results may not be relevant to users because new content is released and existing content becomes stale. Additionally, user interests can vary over time (e.g., in response to current events). Accordingly, the values or ranges of values selected for recommending content over time may not provide optimal content recommendations.

To overcome the above problems, systems and methods are provided for recommending content by tailoring several different content algorithms. In one embodiment, the system continuously selects different values within one or more ranges of the values (e.g., provided by a content provider) over time to provide a recommended content more relevant to the user. For example, the system may select randomly, or based on predetermined heuristics (e.g., algorithms used commonly in the past may be weighted more highly), or by using different algorithms, different values within the range of values provided by the content provider. The system then runs different recommendation algorithms using respective different selected values, which results in several different content recommendations. The system monitors users' behavior on the different content recommendations and iteratively adjusts the range values based on the users' behavior. The process can be repeated over time to continuously provide relevant media content recommendations. In one embodiment, updated content recommendations are provided to the user based on the adjusted range of values.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are disclosed herein for providing content recommendations. As referred to herein, content is any information that can be categorized and communicated to a user. For example, content may comprise media, product, service, news articles etc. Content may be displayed and/or played back to a user as text, a video, a series of pictures, audio or as a combination of any of these.

Figure 1:
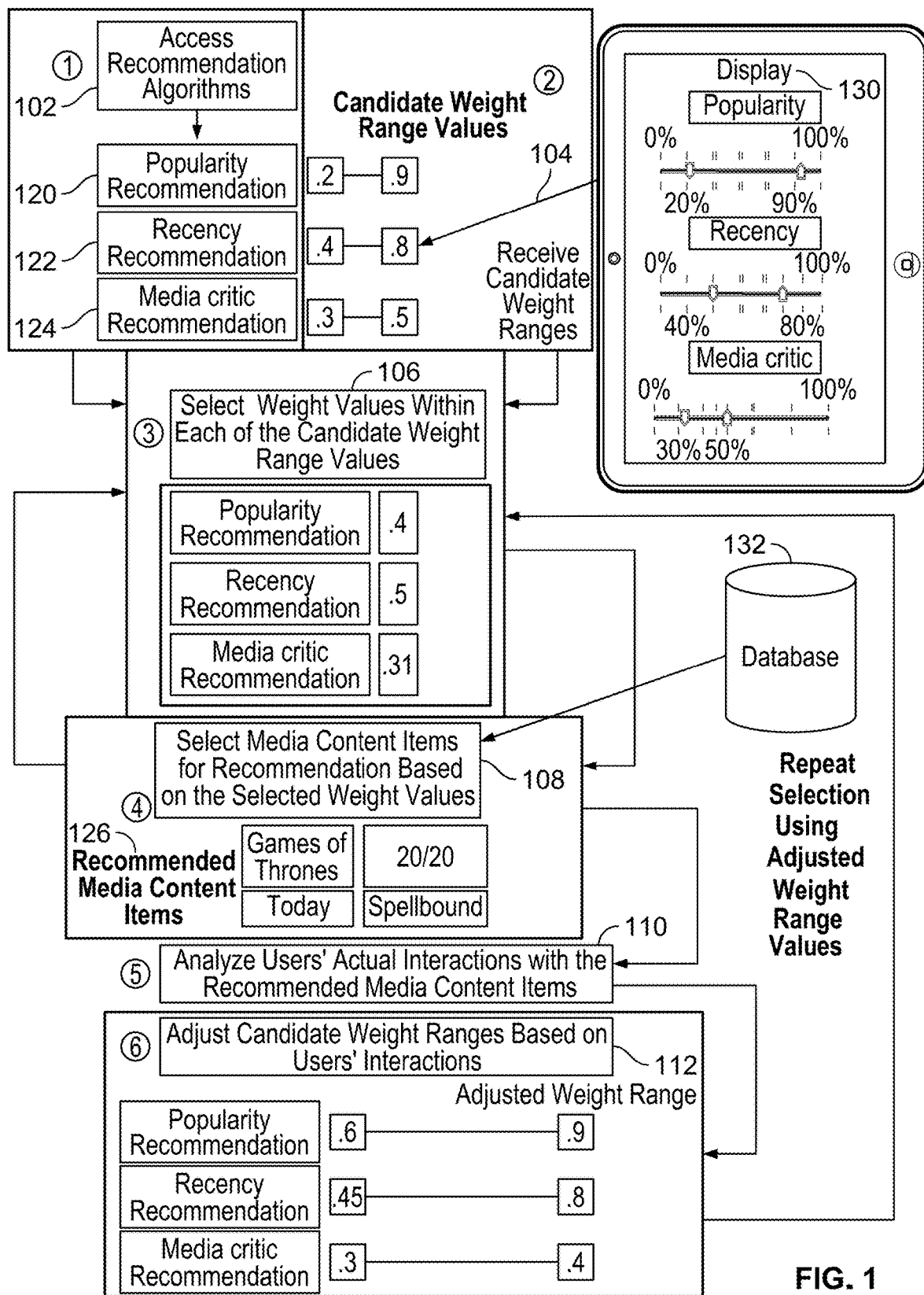
FIG. 1 depicts an illustrative example scenario for a content recommendation application providing media content recommendations, in accordance with some embodiments of the disclosure.

FIG. 1 depicts an illustrative example scenario for a content recommendation application optimizing media content recommendations. Media content may refer to any kind of video, audio, text, or multimedia content, or any combination thereof. For example, a media content item may be a TV show, a movie, a song, a podcast, a video game, any other type of media, or any combination thereof.

At step 102, the content recommendation application may access several recommendation algorithms (e.g., algorithms 120, 122, and 124). Each of these algorithms may utilize different parameters to provide a list of media content items to recommend to a user. Some examples of the parameters include popularity of media content among users, recency of the media content, popularity of media content among users, recency of media content, similar to favorite media content, similar to media content liked by the users, and/or media critic of the media content.

The content recommendation application may use any of the recommendations engines and recommendations techniques as described in U.S. Pat. No. 6,388,714 and in U.S. Pat. No. 6,756,997 (both of which are hereby incorporated by reference herein in their entirety). The content recommendation application may also use an algorithm configured to recommend which tv series a user will consume at a given time of day e.g., series recommendation algorithm). Content may also use an algorithm configured to recommend an object (e.g., one of a Movie object, a Series object, an Episode object, a Program object, and a Sports Event object) to a user. The content recommendation application may also use an algorithm configured to recommend genre of TV series to a user. Content recommendation application may also use an algorithm configured to recommend a media content to user based on popularity rankings of content with other users. Content recommendation application may also use an algorithm configured to recommend a media content to a user based on characteristics of content that are similar to users' "favorite" lists of content. Content recommendation application may also use an algorithm configured to recommend content to a user based on characteristics of content that are similar to users' "likes" lists of content. Content recommendation application may also use an algorithm configured to recommend content to a user based on media critic (i.e. aggregated reviews of the various critics) of the content. Content recommendation application may also use an algorithm configured to recommend content to a user based on user's preferred time of content consumption.

For example, algorithm 120 may provide a list of media content items that are recommended to a user (or a certain demographic of users) based on the parameter of popularity of media content among the users. Algorithm 122 may provide a list of media content items that are recommended to a user (or a certain demographic of users) based on the parameter of recency of media content. In one example, recent media content is a media content (e.g. movie, TV show, music etc.) that was recently released by a content provider for user consumption. Algorithm 124 may provide a list of media content items that are recommended to a user based on the parameter of the media critic of the media content. In one example, reviews of different types of media content (TV, movie, games, music etc.) by leading critics are aggregated and scored to recommend a media content to the user. In some embodiments, the recommendation algorithms may be available locally or accessible via an API (Application Program Interface) call.

In some embodiments, the content recommendation application presents a display screen 130. The display screen 130 may illustrate a weight scale ranging from 0% (0) to 100% (1) providing weight metrics including several candidate range values (minimum value to a maximum value) corresponding to each respective parameter among the different parameters. In one example, the display screen 130 may include sliders (e.g. 603, 605 in FIG. 6), which may be used by a user of a content provider to provide the weight ranges values between 0% to 100% for each of the respective parameters. For example, the weight values illustrated on the weight scale for the popularity recommendation are at 20% (0.2) and at 90% (0.9), which indicates that candidate weight range value for the popularity recommendation parameter is between weight 0.2 (minimum value) and the weight 0.9 (maximum value). The weight values illustrated on the weight scale for recency recommendation are at 40% (0.4) and at 80% (0.8), which indicates that candidate weight range value for the recency recommendation parameter is between weight 0.4 (minimum value) and the weight 0.8 (maximum value). The weight values illustrated on the weight scale for the media critic recommendation are at 30% (0.3) and at 50% (0.5), which indicates that candidate weight range value for the media critic recommendation parameter is between weight 0.3 (minimum value) and the weight 0.5 (maximum value). In one embodiment, the content recommendation application generates the display screen 130. An exemplary embodiment of the display screen is explained in more detail in FIG. 6.

At step 104, the content recommendation application may receive the candidate weight range values. In one embodiment, the recommendation application may access storage or a database to retrieve the candidate weight range values. In one embodiment, the recommendation application may access the display screen 130 to retrieve the candidate weight range values. In one embodiment, the content provider provides the candidate weight values.

At step 106, the content recommendation application selects weight values within each of the candidate weight range values. For example, the weight values selected for the candidate weight range between 0.2 and 0.9 is 0.4. The weight value selected for the candidate weight range between 0.4 and 0.8 is 0.5. The weight value selected for the candidate weight range between 0.3 and 0.4 is 0.31. In one embodiment, these weight values may be selected at random, using a heuristic, or via human input. In one embodiment, the weight values are selected based on a sequence or schedule. For example, each weight range may be divided into a set number of increments and the weight values for each weight range can be sequenced through. The weight values may be similar to parameter value used in other known differential evolution techniques. In one embodiment, step 106 is repeated numerous times to select new weight values different from the previously selected weight values. Accordingly, over time, countless number of new weight values are selected. In one example, step 106 of selecting weight values occurs very frequently. In one embodiment, the new weight values are randomly selected. In another embodiment, the new weight values are selected based on a sequence or schedule. For example, over time, newly selected weight values are previously weight values incremented by 0.1 such as 0.41, 0.42, 0.43 etc. are selected for the candidate weight range between 0.2 and 0.9.

At step 108, the content recommendation application selects media content items for recommendation to users based on the selected weight values. In one embodiment, database 132 includes a list of media content identifiers of available media content items. In one embodiment, the database 132 may also include data for recommendation algorithms (e.g. algorithms 120, 122, and 124). Such data may include values for the available media content items used by the recommendation algorithms to prioritize one media content item over another media content item among the available media items. In some embodiments, each of the recommendation algorithms 120, 122 and 124 computes recommendation scores for each of the available media content items. For example each of the algorithms 120, 122 and 124 generates recommendation scores for each of the available media content items using the selected weight values of each of the corresponding popularity, recency and media critic recommendation parameters respectively. In one embodiment, the content recommendation application adds up the recommendation scores generated by the algorithms 120, 122 and 124 for each of the available media content items and recommends media content items having the highest recommended score. In one embodiment, step 108 of selecting media content items is continuously repeated to select media content items for recommendation based on the respective newly selected weight values. In one example, step 108 of selecting weight values occurs very frequently.

In one embodiment, the content recommendation application retrieves the database 132 and selects the media content items in the list with the highest recommendation score. Identifiers of the selected media content items for recommendation may then be generated for display. In one example, identifiers of the recommended media content items 126 include "Game of Thrones" episode, "20/20" episode, "Today" episode, and a movie "Spellbound". In one example, media content items 126 are determined to have the highest recommendation score and the content recommendation application selects content items 126 as the recommended media content items for recommendation. In one embodiment, the recommended media content items 126 are provided to users.

At step 110, the content recommendation application may analyze users' actual interactions with the recommended media content items 126 to generate aggregated results of analyzed users' interactions. Some examples of users' actual interactions or behavior include user's access, full watch, partial watch, store, pause, time to watch, or frequency of access/watch of the recommended media content items 126. In one embodiment, the content recommendation application tracks users' interactions. For example, the users' actual interactions are tracked on each of the recommended media content items 126 including Game of Thrones" episode, "20/20" episode, "Today" episode, and a movie "Spellbound". In some embodiments, the user's interaction with the recommended media content items 126 is tracked based on a schedule. For example, users' interactions with the recommended media content items may be tracked on a daily basis. Other examples include tracking users' interactions on an hourly, weekly, or monthly basis. In some embodiments, a group of users (e.g., 1000 users) can be selected for tracking, where the group includes active users (i.e., those who consume media content often) and who belong to the same demographic category (e.g., 18-45 age group). In one embodiment, step 110 of analyzing users' actual interactions with the recommended media content items is continuously repeated to generate/update the aggregated results. In one example, step 110 of analyzing users' interactions with the recommended media content items occurs on daily intervals.

In one embodiment, the content recommendation application determines users' engagement levels with the recommended media content items based on the aggregated results. In one example, the content recommendation application may determine from the aggregated results whether the users' engagement level with the recommended media content items is high, fairly high, low, or fairly low. For example, if it is determined that most of the users watched the recommended media content items, then the users' engagement level with the recommended media content items is determined to be high. If it is determined that many of the users watched the recommended media, then the users' engagement level with the recommended media content items is determined to be fairly high. If it is determined that few of the users watched the recommended media content items, then the users' engagement level with the recommended media content items is determined to low.

At 112, the content recommendation application may adjust the candidate weight range values based on the aggregated results. In some embodiments, the content recommendation application determines the recommendation parameter(s) that triggers the user's engagement level (e.g., high, low, fairly high, fairly low) with the recommended content items 126 and adjusts the candidate weight range values corresponding to the respective parameter(s). In one example, maximum values of the candidate weight range values are associated with high users' engagement level and minimum values of the candidate weight range values are associated with low users' engagement level. Thus, the candidate weight range of 0.2 to 0.9 with 0.2 being associated with the lowest users' engagement level and 0.9 being associated with the highest users' engagement level, the candidate weight range of 0.4 to 0.8 with 0.4 being associated with the lowest users' engagement level and 0.8 being associated with the highest users' engagement level and the candidate weight range of 0.3 to 0.5 with 0.3 being associated with the lowest users' engagement level and 0.5 being associated with the highest users' engagement level. For example, if it is determined that the users' engagement levels with the recommended content items 126 is high and attributable to the popularity recommendation parameter (e.g., content items with high popularity recommendation scores are driving the high level of engagement), then the content recommendation application shifts the lower end of the candidate weight range (e.g. via a left slider 603 on the display screen 600) corresponding to the popularity recommendation parameter higher towards the maximum range values. In one example, the candidate weight range 0.2 to 0.9 of the popularity recommendation parameter is changed to 0.6-0.9. For example, if it is determined that the users' engagement levels with the recommended media content items is fairly high, then the content recommendation application determines that the recency recommendation parameter is triggering the user's engagement level to be fairly high and shifts the lower end of the candidate weight range (e.g. via a left slider 603 on the display screen 600) corresponding to the recency recommendation parameter slightly higher towards the maximum range values. In one example, the candidate weight range 0.4 to 0.8 of the recency recommendation parameter is changed to 0.45 to 0.8. For example, if it is determined that the users' engagement level with the recommended media content items is low, then the content recommendation application determines that the media critic recommendation parameter is triggering the user's engagement level to be low and shifts the higher end of candidate weight range (e.g. via a right slider 605 on the display screen 600) corresponding to the media critic recommendation parameter lower towards the minimum range values. In one example, the candidate weight range 0.3 to 0.5 of the media critic recommendation parameter is changed to 0.3 to 0.4. In one embodiment, the content recommendation application may provide the adjusted candidate range values for display on the display screen 130 for each of the popularity, recency and the media critic parameters. Accordingly, the display screen 130 is updated with the adjusted candidate range values. An exemplary embodiment of the updated display screen is explained in more detail in FIG. 6. Even though the example discussed above utilizes user's engagement level as one factor of analysis in adjusting the candidate weight range values, it is understood to one skilled in the art that other factors such as users' request for media content, users' frequency access of the media content, users' interest level in a genre of the media content and combinations may be utilized in adjusting the candidate weight range values. In one embodiment, step 112 of adjusting candidate weight values is continuously repeated based on the aggregated results In one example, step 112 of adjusting weight values occurs on daily intervals.

In one embodiment, the content recommendation application may provide updated recommended media content items based on the adjusted candidate weight range values. In one embodiment, the content recommendation application may select weight value within the adjusted candidate weight values similarly as discussed above with respect to the original candidate weight values. In some embodiments, each of the recommendation algorithms 120, 122 and 124 computes recommendation scores for each of the media content items using the selected weight values in the adjusted candidate weight values and adds up the recommendation scores generated by all of the algorithms 120, 122 and 124 for each of the media content items and updates the recommended media content items based on the media content items having the highest recommendation score. In one example, the updated recommended media content items are the same as the recommended media content items 126 including Game of Thrones" episode, "20/20" episode, "Today" episode, and a movie "Spellbound." In another example, the updated recommended media content items include the recommended media content items 126 and an additional new media content item. For example, the updated recommended media content items include "Game of Thrones" episode, "20/20" episode, "Today" episode, a movie "Spellbound" and a movie "Broken Heart." In a further example, the updated recommended media content items include media content items different from the recommended media content item. 126. For example, the updated recommended media content items include "Away" episode, "Schitts Creek" episode, "Modern Families" episode and a movie "Broken Heart." An exemplary embodiment of providing updated recommended media content items is explained in more detail in FIG. 5. As discussed above steps 106-112 are repeated (steps 106 and 108 repeated frequently and steps 110 and 112 repeated on daily intervals) in order to continuously provide media content recommendations relevant to the user.

Figure 2:
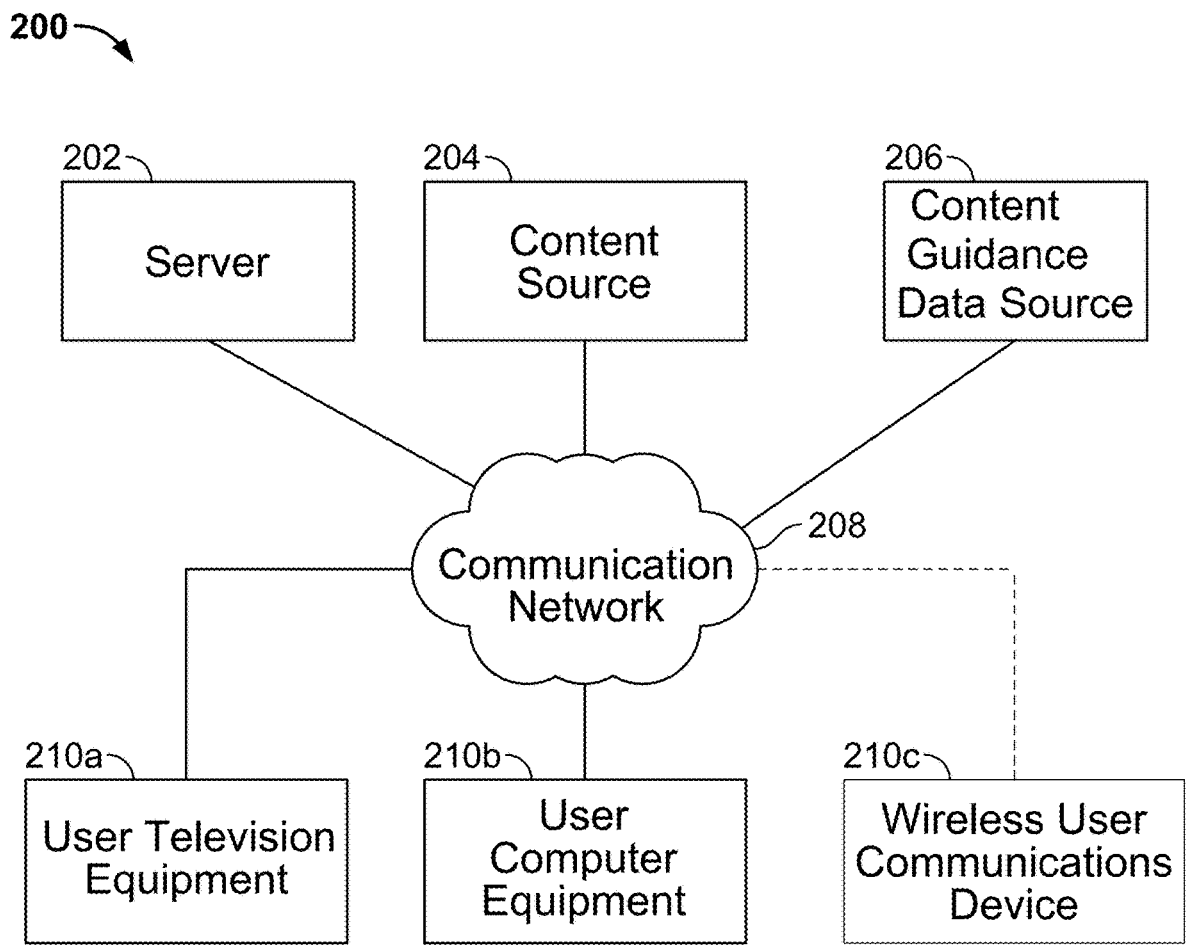
FIG. 2 shows an illustrative block diagram of a system hosting a content delivery application, in accordance with some embodiments of the disclosure.

FIG. 2 shows an illustrative block diagram of a system 200 for displaying content based on content recommendation, in accordance with some embodiments of the disclosure. In various aspects, system 200 includes one or more of server 202, content source 204, content guidance data source 206, communication network 208, and one or more computing devices 210, such as user television equipment 210*a* (e.g., a set-top box), user computer equipment 210*b* (e.g., a laptop), and/or wireless user communications device 210*c* (e.g., a smartphone device). Although FIG. 2 shows one of each component, in various examples, system 200 may include fewer than the illustrated components and/or multiples of one or more illustrated components. Communication network 208 may be any type of communication network, such as the Internet, a mobile phone network, mobile voice or data network (e.g., a 4G or LTE network), cable network, public switched telephone network, or any combination of two or more of such communication networks. Communication network 208 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 208 communicatively couples various components of system 200 to one another. For instance, server 202 may be communicatively coupled to content source 204, content guidance data source 206, and/or computing device 210 via communication network 208.

In some examples, content source 204 and content guidance data source 206 may be integrated as one device. Content source 204 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Content source 204 may be the originator of content (e.g., a television broadcaster, a Webcast provider, etc.) or may not be the originator of content (e.g., an on-demand content provider, an Internet provider of content of broadcast programs for downloading, etc.). Content source 204 may include cable sources, satellite providers, on-demand providers, Internet providers, over-the-top content providers, or other providers of content. Content source 204 may also include a remote media server used to store different types of content (e.g., including video content selected by a user) in a location remote from computing device 210. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content source 204 and content guidance data source 206 may provide content and/or content guidance data to computing device 210 and/or server 202 using any suitable approach. In some embodiments, content guidance data source 206 may provide a stand-alone interactive television program guide that receives program guide data via a data feed (e.g., a continuous feed or trickle feed). In some examples, content guidance data source 206 may provide program schedule data and other guidance data to computing device 210 on a television channel sideband, using an in-band digital signal, an out-of-band digital signal, or any other suitable data transmission technique.

As described in further detail below, server 202 manages the communication of a live content stream (e.g., a live sporting event broadcast, a live news broadcast, or the like) and recorded streams from content source 204 to computing device 210 via communication network 208. For instance, in some embodiments, content from content source 204 and/or guidance data from content guidance data source 206 may be provided to computing device 210 using a client/server approach. In such examples, computing device 210 may pull content and/or content guidance data from server 202 and/or server 202 may push content and/or content guidance data to computing device 210. In some embodiments, a client application residing on computing device 210 may initiate sessions with server 202, content source 204, and/or content guidance data source 206 to obtain content and/or guidance data when needed, e.g., when the guidance data is out of date or when computing device 210 receives a request from the user to receive content or guidance data. In various aspects, server 202 may also be configured to detect events within the live content stream and, based on the detected events, control the display of content and/or navigation menu options via computing device 210. Additionally, although FIG. 2 shows content source 204 and content guidance data source 206 as separate from server 202, in some embodiments, content source 204 and/or content guidance data source 206 may be integrated as one device with server 202.

Content and/or content guidance data delivered to computing device 210 may be over-the-top (OTT) content. OTT content delivery allows Internet-enabled user devices, such as computing device 210, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOU-TUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide content guidance data described above. In addition to content and/or content guidance data, providers of OTT content can distribute applications (e.g., web-based applications or cloud-based applications), or the content can be displayed by applications stored on computing device 210.

Figure 3:
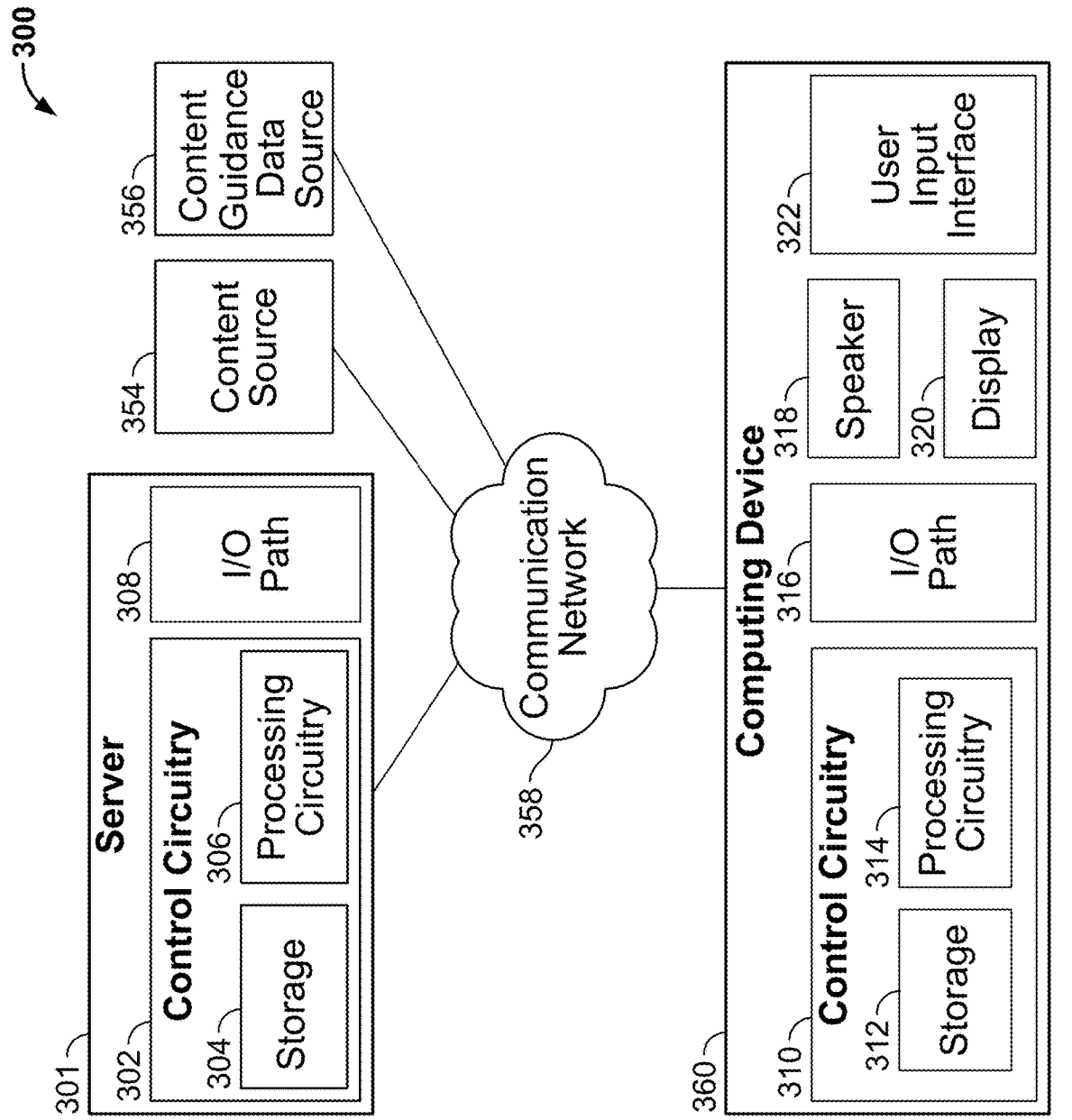
FIG. 3 is an illustrative block diagram showing additional details of a system hosting the content delivery application, in accordance with some embodiments of the disclosure.

FIG. 3 is an illustrative block diagram showing additional details of the system 300 (which may be the same as system 200 of FIG. 7), in accordance with some embodiments of the disclosure. In particular, server 301 (e.g., the same server as server 202) includes control circuitry 302 and I/O path 308, and control circuitry 302 includes storage 304 and processing circuitry 306. Computing device 360 (e.g., one or more of devices 210a, 210, and 210c) includes control circuitry 310, I/O path 316, speaker 318, display 320, and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 300 (e.g., storages of content source 354, content guidance data source 356, and/or the like) may be an electronic storage device. In some embodiments, content source 354 may be the same as content source 204. In some embodiments, content guidance data source 356 may be the same as content source 206. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 300 may be used to store various types of content, content guidance data, and or other types of data. Non-volatile memory may also be used (e.g., to launch a boot-up routine and other instructions). Cloud-based storage may be used to supplement storages 304, 312 or instead of storages 304, 312. In some embodiments, control circuitry 302 and/or 310 executes instructions for a content recommendation application stored in memory (e.g., storage 304 and/or 312). Specifically, control circuitry 302 and/or 310 may be instructed by the content recommendation application to perform the functions discussed herein. In some implementations, any action performed by control circuitry 302 and/or 310 may be based on instructions received from the content recommendation application. For example, the content recommendation application may be implemented as software or a set of executable instructions that may be stored in storage 304 and/or 312 and executed by control circuitry 302 and/or 310. In some embodiments, the content recommendation application may be a client/server content recommendation application where only a client content recommendation application resides on computing device 360, and a server content recommendation application resides on server 301.

The content recommendation application may be implemented using any suitable architecture. For example, it may be a stand-alone content recommendation application wholly implemented on computing device 360. In such an approach, instructions for the content recommendation application are stored locally (e.g., in storage 312), and data for use by the content recommendation application is downloaded on a periodic basis (e.g., from an out-of-band feed, from an Internet resource, or using another suitable approach). Control circuitry 310 may retrieve instructions for the content recommendation application from storage 312 and process the instructions to perform the functionality described herein. Based on the processed instructions, control circuitry 310 may determine what action to perform when input is received from user input interface 322.

In client/server-based embodiments, control circuitry 310 may include communication circuitry suitable for communicating with a content recommendation application server (e.g., server 301) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 358). In some embodiments, communication network 358 may be the same as network 208. In another example of a client/server-based application, control circuitry 310 runs a web browser that interprets web pages provided by a remote server (e.g., server 301). For example, the remote server may store the instructions for the application in a storage device. The remote server may process the stored instructions using circuitry (e.g., control circuitry 302) and generate the displays discussed above and below. Computing device 360 may receive the displays generated by the remote server and may display the content of the displays locally via display 320. This way, the processing of the instructions is performed remotely (e.g., by server 301) while the resulting displays, such as the display windows described elsewhere herein, are provided locally on computing device 360. For example, computing device 360 may include display circuitry (e.g., video card circuitry or combination motherboard and video card circuitry) configured to generate for display the display windows. Computing device 360 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a remote control, trackball, keypad, keyboard, touchscreen, touchpad, stylus input, joystick, voice recognition interface, or other user input interfaces. User input interface 322 may be integrated with or combined with display 320, which may be a monitor, television, liquid crystal display (LCD), electronic ink display, or any other equipment suitable for displaying visual images.

Server 301 and computing device 360 may receive content and data via input/output (hereinafter "I/O") path 308 and 316, respectively. For instance, I/O path 316 may include circuitry that includes one or more of communication port configured to receive a live content stream from server 301 and/or content source 354 via a communication network 358. Storage 312 may be configured to buffer the received live content stream for playback, and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Figure 4:
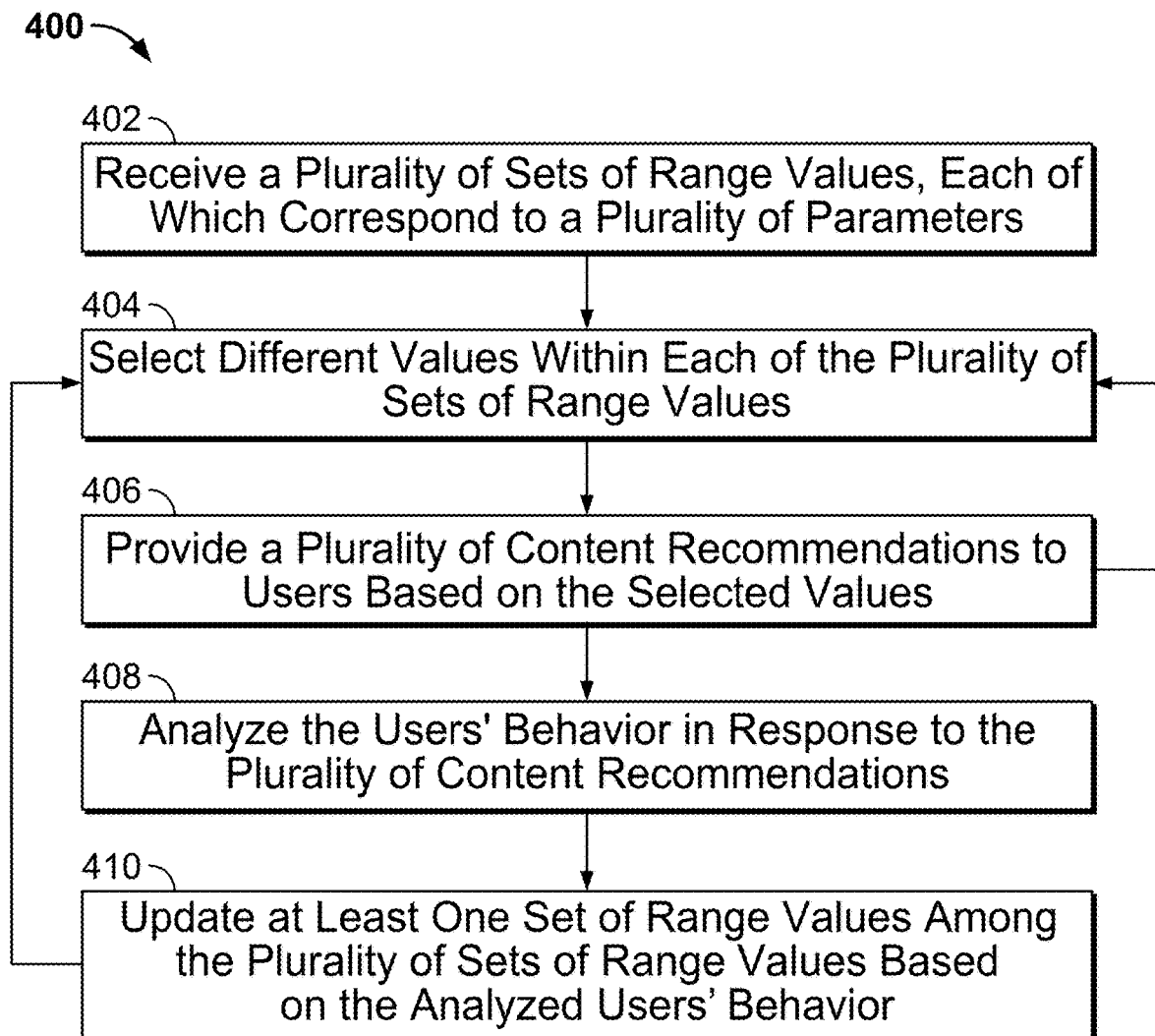
FIG. 4 depicts an illustrative flowchart of a process for providing content recommendations, in accordance with some embodiments of the disclosure.

Having described systems 200 and 300, reference is now made to FIG. 4, which depicts an illustrative flowchart of process 400 for providing content recommendations that may be implemented by using systems 200 and 300, in accordance with some embodiments of the disclosure. In various embodiments, the individual steps of process 400 may be implemented by one or more components of systems 200 and 300. Although the present disclosure may describe certain steps of process 400 (and of other processes described herein) as being implemented by certain components of systems 200 and 300, this is for purposes of illustration only, and it should be understood that other components of systems 200 and 300 may implement those steps instead. For example, steps of process 400 may be executed by server 302 and/or by computing device 360 to provide content recommendations.

At step 402, control circuitry 310 receives a plurality of sets of range values (e.g. candidate weight values of FIG. 1), each of which corresponds to a respective one of a plurality of parameters for recommending content. As discussed above, some examples of the parameters include. popularity of content among users, recency of content, similar to favorite content, similar to content liked by the users, and/or critic of the content.

In one embodiment, each of the plurality of sets of range values is provided by the content provider. In some embodiments, control circuitry 310 may access the sets of range values via an API from server 302, or from content guidance data source 356. For example, control circuitry 310 may access a screen (e.g. provide input for the algorithms) or database and receive results via communications network 358. In one embodiment, control circuitry 310 may store the range values locally in storage 312.

At 404, control circuitry 310 may select different values within each of the plurality of sets of range values over time. In one embodiment, the values are randomly selected. In another embodiment, the values are selected based on a sequence or schedule. For example, each range may be divided into a set number of increments and the values for each range can be sequenced through. At 406, control circuitry 310 may provide a plurality of recommended content items based on the selected different values. In one embodiment, recommended content items (e.g. 126 of FIG. 1) are selected from a list of available content items stored in a database (e.g. 132 of FIG. 1). Steps 404 to 406 are repeated over time in order to continuously provide media content recommendations based on the continuous selection of different values within each of the plurality of sets of range values.

At step 408, control circuitry 310 analyzes users' behavior in response to the plurality of content recommendations. For example, control circuitry 310 may track the users' behavior or interaction with each of the plurality of content items over a predetermined period of time. For example, control circuitry 310 may track behavior by a single user, or by a group of users (e.g., 2,000 particularly active users in a selected demographic category). For example, control circuitry 310 may track users' behavior for content items received at content sources 354, or at server 301 via communications network 358.

At step 410, control circuitry 310 updates the at least one set of range values among the plurality of sets of range values. In one embodiment, the process is repeated from step 404 using the updated range values in order to continuously provide content recommendations relevant to the users. In some embodiments, the control circuitry 310 provides updated recommended content items (e.g., to users at a later time) based on the at least one updated set of range values. In one example, the updated recommended content items are the same as the content items recommended at step 406. In another example, the updated recommended content items may include content item(s) different from the recommended content items at step 406. In a further example, the updated recommended content items may include a combination of the same content items recommended at step 406 and content items different from the content items recommended at step 406. Steps 404 to 410 are repeated over time in order to continuously provide media content recommendations relevant to the users.

Figure 5:
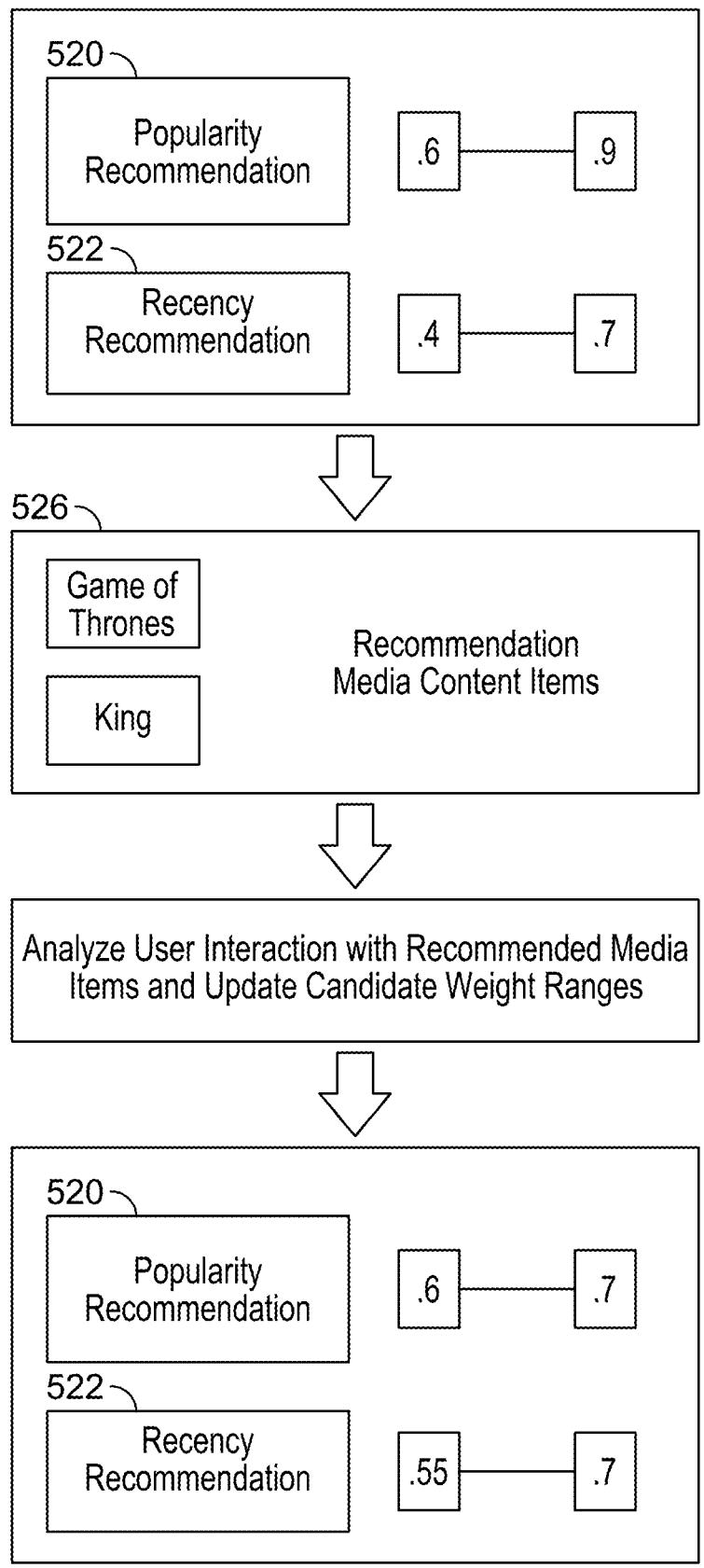
FIG. 5 depicts an illustrative example scenario for providing media content recommendations, in accordance with some embodiments of the disclosure.

FIG. 5 depicts a simplified example of an illustrative scenario for providing media content recommendations by using systems 200 and 300, in accordance with some embodiments of the disclosure. In particular, FIG. 5 depicts an exemplary way to reoptimize media content items recommendations based on candidate weight ranges and users' behavior.

In one example, the control circuitry 310 may access several recommendation algorithms (e.g., algorithms 520, 522). Each of these algorithms may utilize different parameters to provide a list of media content items to recommend to a user. For example, algorithm 520 (similar to algorithm 120) may provide a list of media content items for recommendation to users based on the parameter of popularity recommendation of media content among the users. Algorithm 522 may provide a list of media content items based on the parameter of recency recommendation of media content. In one example, a movie is recently released (for example, the user may be recommended with a media content that was recently released and the user has not watched this newly released media content). In one example, the candidate weight range value for the popularity recommendation parameter is between 0.6 (minimum value), and 0.9 (maximum value) and the candidate weight range value for the recency recommendation parameter is between 0.4 (minimum value) to 0.7 (maximum value). In one embodiment, the control circuitry 310 selects weight values (not shown) within each of the candidate weight ranges. In one embodiment, these weight values may be selected at random, using a heuristic, or via human input. In one embodiment, the weight values are selected based on a sequence or schedule. For example, each weight range may be divided into a set number of increments and the weight values for each weight range can be sequenced through. The weight values may be similar to parameter value used in other known differential evolution techniques.

In one embodiment, the control circuitry 310 selects weight values within the candidate weight range values for the popularity recommendation parameter and for the recency recommendation parameter. In one embodiment, the algorithm 520 computes recommendation scores for each of available media content items based on the selected weight values for the popularity recommendation parameter. Similarly, the algorithm 522 computes recommendation scores for each of available media content items based on the selected weight values for the recency recommendation parameter. In one embodiment, the control circuitry 310 adds up the two recommendation scores for each of the available media content items and recommends media content items among the available media content items with the highest recommendation scores.

For example, recommended media content items 526 includes "Game of Thrones" and "King". In one example, the movie "Game of Thrones" is released a year ago and is very popular among the users. As a result, the algorithm 522 would compute a low recommendation score because "Game of Thrones" is older and algorithm 520 would compute a higher recommendation score because "Game of Thrones" is popular. In another example, the "King" is released a month ago but not very popular among the users. As a result, the algorithm 520 would compute a low recommendation score because "King" is not very popular and algorithm 522 would compute a higher recommendation score because "King" is recent.

In one embodiment, the control circuitry 310 generates for display identifiers of the recommended media content items 526 to the users. The control circuitry 310 analyzes the users' behavior to determine users' engagement level to each of the recommended media content items 526. In one embodiment, the control circuitry analyzes users' interaction with the recommended media items 526 and updates the candidate weight ranges. In one example, the control circuitry 310 determines that most of the users are watching "King" and thus the user's engagement level to the movie "King" is high and the user's engagement level to "Game of Thrones" is low. The control circuitry 310 analyzes the algorithms 520, 522 and corresponding computed recommendation scores and determines that higher content recency causes more user engagement than higher popularity. The control circuitry 310 may update the candidate weight range values accordingly. In one example, control circuitry 310 may increase the lower end of the candidate weight range of the recency recommendation parameter to increase the recommendation weighting of recent content. Thus, the candidate weight range of 0.4 to 0.7 for example is changed to 0.55 to 0.7. In another example, control circuitry 310 may decrease the higher end of the candidate weight range of the popularity recommendation parameter to decrease the recommendation weighting of the popular content. Thus, the candidate weight range of 0.6 to 0.9 for example is changed to 0.6 to 0.7. In a further example, control circuitry 310 may increase the lower end of the candidate weight range of the recency recommendation parameter and decrease the higher end of the candidate weight range of the popularity recommendation parameter. Thus, for example, as shown in FIG. 5, the candidate weight range of 0.4 to 0.7 for the recency recommendation parameter is changed to 0.55 to 0.7 and the candidate weight range of 0.6 to 0.9 for the popularity recommendation is changed to 0.6 to 0.7.

Figure 6:
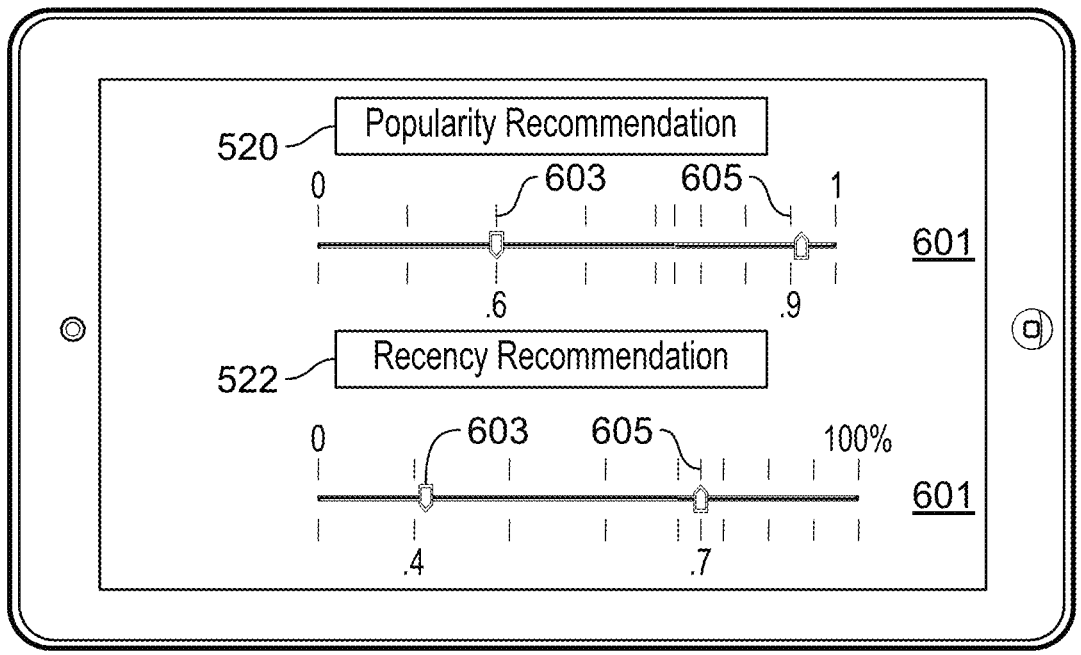
FIG. 6 depicts an illustrative example display of parameters and corresponding candidate weight ranges for the media content, in accordance with some embodiments of the disclosure.
Figure 6:
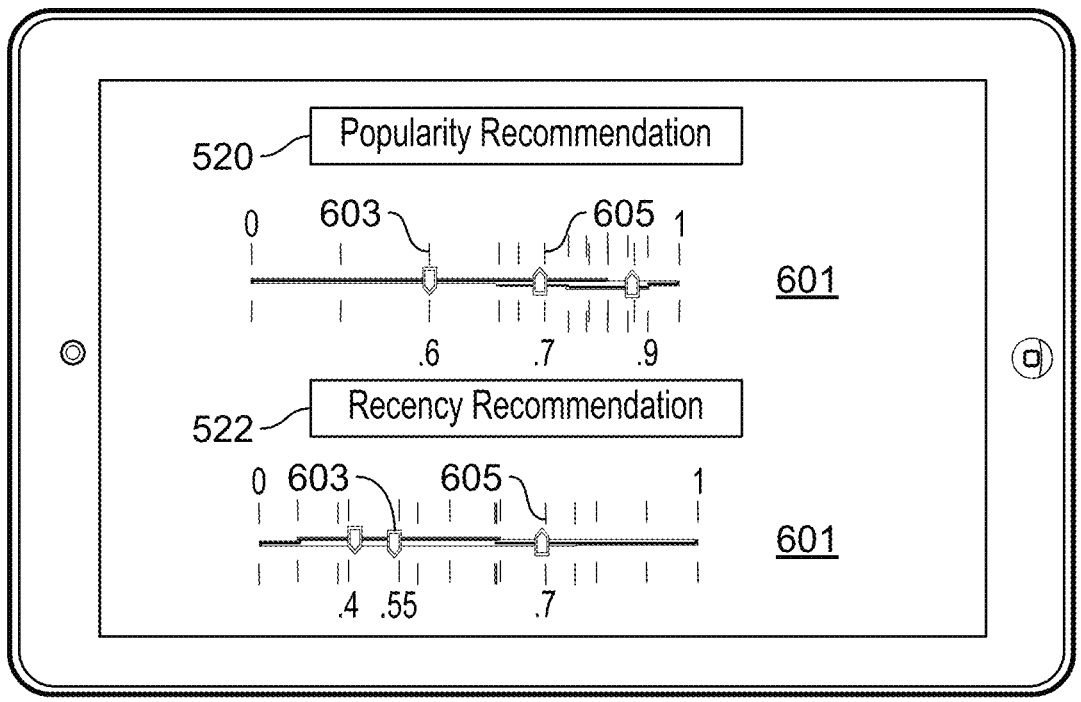

FIG. 6 depicts an example of a display screen illustrating different parameters for providing content recommendations by using systems 200 and 300, in accordance with some embodiments of the disclosure. In particular, FIG. 6 depicts a screen 600 displaying parameters and their corresponding candidate weight range values of FIG. 5 and an updated screen 602 displaying the parameters and their corresponding updated candidate weight range values of FIG. 5.

Display screen 600 includes a weight scale 601 ranging from 0 to 1, a left slider 603 and a right slider 605. In one example, a user of the content provider may move the left and the right sliders 603 and 605 respectively to provide the candidate weight range values. For example, the user may move the left and the right sliders 603 and 605 respectively between the range of 0 to 1 to provide the candidate weight range values. In one example, the display screen 600 shows the left slider 603 moved to 0.6 weight value and the right slider 605 to 0.9 weight value for the popularity prediction parameter 520, thus indicating the candidate weight range values to be between 0.6 and 0.9. Similarly, the display screen 600 shows the left slider 603 moved to 0.4 weight value and the right slider 605 moved to 0.7 weight value for the recency predication parameter 522, thus indicating that the candidate weight range values to between 0.4 to 0.7.

As discussed above, the control circuitry 310 may update the candidate weight range values illustrated in the display screen 600 resulting in the updated display screen 602. The updated screen 602 displays the updated candidate range values for the popularity prediction parameter 520 and the updated candidate range values for the recency prediction parameter 522. In one embodiment, the system varies the current range within the candidate weight range values. For example, as shown, the right slider 605 is moved from 0.9 weight value to 0.7 weight value while the left slider 603 remains in the same position at the 0.6 weight value for the popularity prediction parameter 520, illustrating the updated candidate weight range values to be between 0.6 to 0.7. Also, as shown, the left slider 603 is moved from 0.4 weight value to 0.55 weight value and the right slider 605 remains in the same position at the 0.7 weight value for the recency prediction parameter 522, illustrating the updated candidate weight range values to be between 0.55 and 0.7. In one embodiment, the control circuitry 310 utilizes the updated candidate weight range values to generate content recommendation. In one embodiment, the control circuitry 310 provides the updated display screen 602 as a feedback to the content provider. In some embodiments, display screen is not used and the candidate weight range values and the updated candidate weight range values are stored in a memory.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    receiving a plurality of weight ranges, each weight range corresponding to a parameter of a plurality of parameters;
    selecting a weight value for each parameter based on a respective weight range;
    determining a recommendation score based on the selected weight values for the plurality of parameters;
    generating for display a content recommendation to a user device according to the recommendation score determined;
    receiving input from the user device in response to the content recommendation;
    adjusting, using control circuitry, each weight range of the plurality of weight ranges based on the received input from the user device; and
    generating for display a second content recommendation to the user device based on the adjusted weight ranges.

2. The method of claim 1, further comprising providing a second content recommendation based on the adjusting of at least one of the respective weight ranges.

3. The method of claim 1, wherein receiving the user's input comprises:
    tracking the user's input in response the content recommendation; and
    analyzing the user's input to determine the user's engagement levels with the content recommendation.

4. The method of claim 3, wherein the adjusting comprises shifting the weight ranges based on the user's engagement levels with the content recommendation.

5. The method of claim 1, wherein the plurality of parameter weight ranges is received from a content provider.

6. The method of claim 1, wherein selecting the weight value comprises randomly selecting a weight value bounded by the respective weight range.

7. The method of claim 1, wherein the plurality of parameters comprises popularity of content among users.

8. The method of claim 1, wherein the plurality of parameters further comprises one or more of recency of content and similarity to favorite content.

9. The method of claim 1, wherein the plurality of parameters further comprises one or more of similarity to content liked by the users, and/or critic of the content.

10. The method of claim 1, wherein the adjusting is performed based on a schedule.

11. A system for recommending a content, the system comprising:
    a memory configured to store parameter data;
    control circuitry configured to:
        receive a plurality of weight ranges, each weight range corresponding to a parameter of a plurality of parameters stored in the memory;
        select a weight value for each parameter based on a respective weight range;
        determine a recommendation score based on the selected weight values for the plurality of parameters;
        generate for display a content recommendation to a user device according to the recommendation score determined;
        receive input from the user device in response to the content recommendation;
        adjust, using control circuitry, each weight range of the plurality of weight ranges based on the received input from the user device; and
        generate for display a second content recommendation to the user device based on the adjusted weight ranges.

12. The system of claim 11, wherein, to receive the user's input, the control circuitry is further configured to:
    provide a second content recommendation based on the adjusting of at least one of the respective weight ranges.

13. The system of claim 11, wherein the control circuitry is configured to:
    track the user's input in response the content recommendation; and
    analyze the user's input to determine the user's engagement levels with the content recommendation.

14. The system of claim 13, wherein the control circuitry is configured to:
    shift the weight ranges based on the user's engagement levels with the content recommendation.

15. The system of claim 11, wherein the plurality of parameter weight ranges is received from a content provider.

16. The system of claim 11, wherein the selection of the weight value comprises randomly selecting a weight value bounded by the respective weight range.

17. The system of claim 11, wherein the plurality of parameters comprises popularity of content among users.

18. The system of claim 11, wherein the plurality of parameters comprises one or more of recency of content and similarity to favorite content.

19. The system of claim 11, wherein the plurality of parameters further comprises one or more of similarity to content liked by the users and/or a critic of the content.

20. The system of claim 11, wherein the control circuitry is configured to perform the adjusting of each weight range based on a schedule.

* * * * *